United States Patent
Zhong et al.

(10) Patent No.: US 10,240,073 B2
(45) Date of Patent: Mar. 26, 2019

(54) LITHIUM-ION BATTERY HAVING A BONDING AGENT

(71) Applicant: NingDe Contemporary Amperex Technology Limited, NingDe, FuJian Province (CN)

(72) Inventors: Ze Zhong, NingDe (CN); Chengdong Sun, NingDe (CN); Huihui Liu, NingDe (CN); Xinghui Wang, NingDe (CN); Zengbin Wei, NingDe (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 107 days.

(21) Appl. No.: 15/297,076

(22) Filed: Oct. 18, 2016

(65) Prior Publication Data

US 2017/0204308 A1    Jul. 20, 2017

(30) Foreign Application Priority Data

Jan. 19, 2016  (CN) .......................... 2016 1 0033956

(51) Int. Cl.
| | |
|---|---|
| H01M 4/13 | (2010.01) |
| C09J 127/16 | (2006.01) |
| C08F 214/22 | (2006.01) |
| H01M 10/0525 | (2010.01) |
| H01M 4/62 | (2006.01) |

(52) U.S. Cl.
CPC .......... *C09J 127/16* (2013.01); *C08F 214/225* (2013.01); *H01M 4/623* (2013.01); *H01M 10/0525* (2013.01); *C08F 2800/10* (2013.01)

(58) Field of Classification Search
CPC .............. H01M 4/623; H01M 10/052; H01M 10/0525; C09J 127/16; C08F 214/225
See application file for complete search history.

(56) References Cited

U.S. PATENT DOCUMENTS

| | | | | |
|---|---|---|---|---|
| 4,581,412 A | * | 4/1986 | Ohmori ................. | C07C 17/275 525/199 |
| 2006/0141358 A1 | * | 6/2006 | Yun ....................... | H01M 4/131 429/212 |
| 2014/0346410 A1 | * | 11/2014 | Lu ......................... | H01M 4/136 252/506 |

* cited by examiner

*Primary Examiner* — Raymond Alejandro
(74) *Attorney, Agent, or Firm* — Arent Fox LLP

(57) ABSTRACT

The present disclosure relates to a lithium-ion battery bonding agent and a lithium-ion battery comprising the same. The bonding agent may be a polymer comprising structural units represented by Formula I, Formula II, Formula III, and Formula IV, and has an average molecular weight of 500,000 to 1.2 million. The bonding agent may be incorporated into at least one of a positive film, a negative film, a separator, and an electrolyte in the battery. The bonding agent can significantly improve the flexibility of the positive film, avoid processability and battery performance issues caused by the electrode film being too brittle, and help improve the compact density and battery energy density.

10 Claims, 3 Drawing Sheets

LITHIUM-ION BATTERY HAVING A BONDING AGENT

CROSS-REFERENCE TO RELATED APPLICATION

This application claims the benefit of Chinese Patent Application No. 201610033956.0, entitled "BONDING AGENT AND LITHIUM-ION BATTERY THEREOF" and filed on Jan. 19, 2016 in the State Intellectual Property Office of the People's Republic of China (PRC) (SIPO), the disclosure of which is expressly incorporated by reference herein in its entirety.

BACKGROUND

Field

The present disclosure relates generally to the field of lithium-ion batteries, and more particularly, to a lithium-ion battery bonding agent and a lithium-ion battery comprising said bonding agent.

Background

With advantages such as high energy density, high working voltage, and long cycle life, lithium-ion batteries have been extensively used on civilian apparatuses such as mobile phones, laptops, and digital products, as well as high-tech equipment such as unmanned aerial vehicles, space flight, and satellites. Lithium-ion batteries mainly comprise a positive film, a negative film, a separator and an electrolyte. The negative film typically uses natural graphite or artificial graphite as an active substance, sodium carboxymethyl cellulose (CMC) as a dispersing agent, and styrene-butadiene rubber (SBR) as a bonding agent. In the positive film, on the other hand, lithium cobalt oxide ($LiCoO_2$) is commonly used as an active substance, conductive carbon as a conductive agent, and polyvinylidene difluoride (PVdF) as a bonding agent.

When fabricating a lithium-ion battery, firstly, coat positive and negative electrode pastes on corresponding current collectors, dry and then subject to cold pressing, and then perform subsequent processes. After cold pressing, graphite, CMC, and SBR in the negative electrode (anode) are all soft materials themselves, thus the electrode film is relatively soft. As for the positive electrode (cathode), however, $LiCoO_2$ and PVdF have relatively high hardness, and PVdF has a strong crystallinity, making it easy to have the issue that the electrode film becomes brittle after cold pressing, and may lead to problems that the active substance cracks and falls off in the subsequent strip division and sheet cutting, and that the electrode film breaks in the winding process, which detrimentally affect the battery production and performance.

To improve the flexibility of a positive film after cold pressing, a method of modification by copolymerization is typically adopted on PVdF. Homopolymer PVdF has a strong crystallinity, and the material itself has high strength and hardness, and the introduction of other structural units into PVdF by means of modification by copolymerization may reduce the degree of order of the PVdF molecular structure, lower crystallinity, and may improve the ductility and elongation at break of PVdF. When the modified PVdF is used as a bonding agent for a positive film, the flexibility of the electrode film after cold pressing can be improved.

For performing modification by copolymerization on PVdF, a commonly used copolymerization monomer is hexafluoropropylene, and the obtained PVdF-HFP has a significantly lowered crystallinity and improved elongation at break relative to homopolymer PVdF. When PVdF-HFP is used as a bonding agent for a positive film, the flexibility of the electrode film is improved, which helps to improve the compact density, thus improving battery energy density. However, the bonding force of PVdF-HFP is significantly reduced relative to copolymer PVdF. During the manufacture process, the positive electrode active substance could fall off as a result of the low bonding force. When an electrolyte is injected into the battery, PVdF-HFP swells greater than that of homopolymer PVdF does, the bonding force of the positive film decreases by a greater degree, leading to the problem of the active substance falling off after formation and aging and during the battery use, and consequently leading to significantly decreased performance or failure of the battery.

The present disclosure is hereby proposed in view of the drawbacks of the traditional technologies.

SUMMARY

A first objective of the present disclosure is to provide a bonding agent.

A second objective of the present disclosure is to provide a lithium-ion battery comprising said bonding agent.

To attain the objectives of the present disclosure, the following technical solution is employed:

The present disclosure relates to a bonding agent, said bonding agent being a polymer comprising structural units represented by Formula I, Formula II, Formula III, and Formula IV:

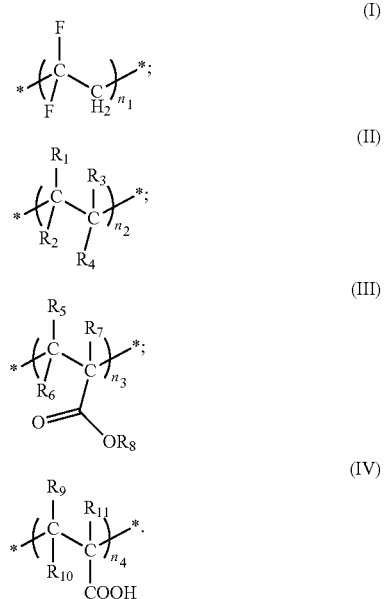

Wherein, each of $R_1$, $R_2$, $R_3$, and $R_4$ is independently selected from the group consisting of hydrogen, and $C_{1-8}$ straight-chain or branched alkyl groups substituted by a substituting group or not substituted by a substituting group; each of $R_5$, $R_6$, and $R_7$ is independently selected from the group consisting of hydrogen, and $C_{1-6}$ straight-chain or branched alkyl groups substituted by a substituting group or not substituted by a substituting group; $R_8$ is selected from $C_{1-15}$ alkyl groups substituted by a substituting group or not substituted by a substituting group; each of $R_9$, $R_{10}$, and $R_{11}$ is independently selected from the group consisting of hydrogen, and $C_{1-6}$ straight-chain or branched alkyl groups substituted by a substituting group or not substituted by a substituting group.

The substituting group is selected from halogens. And each of $n_1$, $n_2$, $n_3$ and $n_4$ is independently an integer greater than 0.

In one aspect, the molar percent of structural units represented by Formula I in the bonding agent is 50% to 90%, and in a further aspect, 60 to 75%. In one aspect, the molar percent of structural units represented by Formula II in the bonding agent is 0.1% to 20%, and in a further aspect, 5% to 10%. In one aspect, the molar percent of structural units represented by Formula III in the bonding agent is 1% to 25%, and in a further aspect, 10% to 25%. In one aspect, the molar percent of structural units represented by Formula IV in the bonding agent is 0.1% to 10%, and in a further aspect, 3% to 5%.

In one aspect, in Formula II, each of $R_1$, $R_2$, $R_3$, and $R_4$ is independently selected from the group consisting of hydrogen, and $C_{1-6}$ straight-chain or branched alkyl groups. In one aspect, each of $R_1$, $R_2$, $R_3$, and $R_4$ is independently selected from the group consisting of hydrogen and $C_{1-3}$ alkyl groups.

In one aspect, in Formula III, each of $R_5$, $R_6$, and $R_7$ is independently selected from the group consisting of hydrogen and $C_{1-3}$ alkyl groups. $R_8$ is selected from $C_{1-12}$ alkyl groups substituted by a substituting group or not substituted by a substituting group.

In one aspect, in Formula III, each of $R_5$, $R_6$, and $R_7$ is independently selected from the group consisting of hydrogen, methyl, and trifluoromethyl. $R_8$ is selected from the group consisting of methyl, ethyl, n-butyl, isobutyl, sec-butyl, t-butyl, n-propyl, cyclohexyl, $C_{12}$ alkyl, 2-ethylhexyl, isobornyl, trifluoroethyl, and trifluoromethyl.

In one aspect, in Formula IV, each of $R_9$, $R_{10}$, and $R_{11}$ is independently selected from the group consisting of hydrogen and $C_{1-3}$ alkyl groups. In one aspect, each of $R_9$, $R_{10}$, and $R_{11}$ is independently selected from the group consisting of hydrogen, methyl, and trifluoromethyl.

In one aspect, the number average molecular weight of the bonding agent is 500,000 to 1.2 million.

The present disclosure further relates to a lithium-ion battery, comprising a positive film, a negative film, a separator, and an electrolyte. At least one of the positive film, the negative film, and the separator comprises the bonding agent according to the present disclosure.

In one aspect, the lithium-ion battery comprises the bonding agent in the positive film.

In one aspect, the positive film comprises a positive electrode current collector and a positive electrode active substance layer, and the percent by weight of the bonding agent in the positive electrode active substance layer is 1.0% to 5.0%.

The present disclosure has the following advantageous effects:

Using a copolymerization method, the present disclosure obtains vinylidene difluoride-alkyl unit-acrylate-acrylic acid copolymer (PVdF-Ac). By controlling monomer ratios in the polymerization process, the contents of alkyl unit, acrylate, and acrylic acid structural unit in PVdF-Ac can be adjusted. The main structural unit in PVdF-Ac is PVdF, which has excellent anti-oxidation and electrochemical stability.

Compared with homopolymer PVdF that has a similar molecular weight, alkyl unit, acrylate, and acrylic acid are copolymerized in PVdF-Ac and therefore, the regularity of the molecular chain is reduced, the material has a lowered crystallinity, which is reflected by a soft material and high elongation at break. When alkyl units are copolymerized, the flexibility and tensile strength of the material have both been improved, which helps to improve the compact density and energy density of the battery. By introducing a structural unit of acrylate, the regularity of the main PVdF-Ac chain is further reduced, the crystallinity is lowered, and the acrylate structural unit is relatively soft, which directly results in the elongation at break of the PVdF-Ac adhesive film being greater than that of homopolymer PVdF.

When used on a positive electrode of a lithium-ion battery, given the same compact density, the electrode film according to the present disclosure has a significantly superior flexibility than homopolymer PVdF does, as well as excellent processability. PVdF-Ac has a low crystallinity and swells greatly in an electrolyte, but acrylate in the structure of PVdF-Ac has a high bonding force and good affinity with aluminum foil. The —COOH unit in acrylic acid monomers can have a strong hydrogen bond action with aluminum foil. As a result, although PVdF-Ac swells greater in an electrolyte than homopolymer PVdF does, its bonding force with an active substance and aluminum foil is greater than that of homopolymer PVdF. Moreover, the electrode film has better flexibility and excellent processability. After swelling through immersion in an electrolyte, the acrylate units have very good ion-transferring performance, and the performance is also better than homopolymer PVdF when a lithium-ion battery is made.

The use of PVdF-Ac according to the present disclosure as a bonding agent for a positive electrode of a lithium-ion battery can significantly improve flexibility of the positive film, avoid manufacture and battery performance issues caused by the electrode film being too brittle, and help improve the compact density and energy density of the battery.

DETAILED DESCRIPTION

Figure 1:
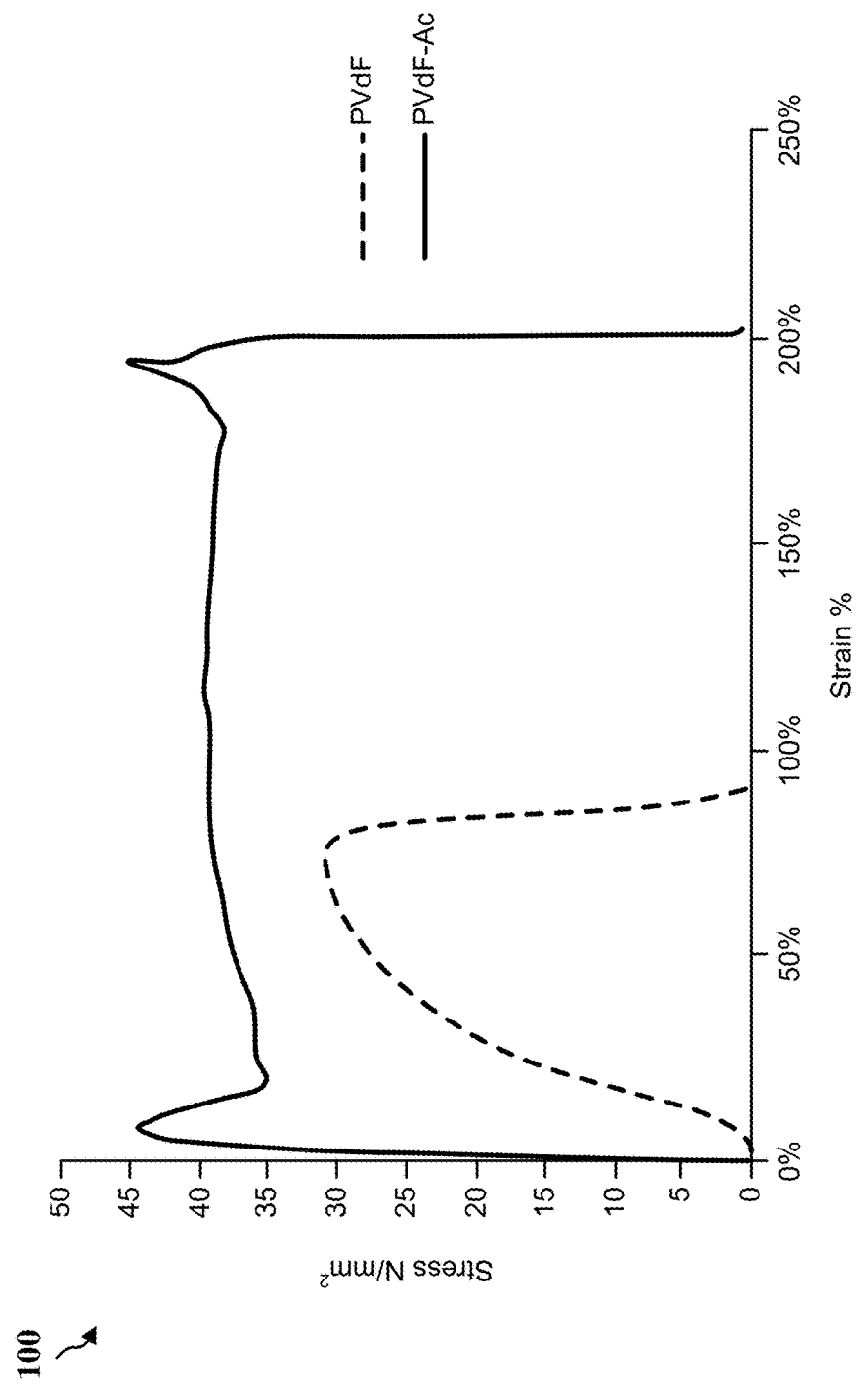
FIG. 1 is a diagram illustrating comparison curves of breaking strength and elongation at break of adhesive films of PVdF-Ac and homopolymer PVdF.

The present disclosure and the advantageous effects of certain configurations will be further described in detail below with reference to the accompanying drawings and specific embodiments. It should be understood that these embodiments are only used to describe the present disclosure and are not used to limit the scope of the present disclosure.

The present disclosure provides a positive electrode bonding agent, as well as a positive film and a lithium-ion battery fabricated with said bonding agent. Without detrimentally impacting the performance of the lithium-ion battery, the present disclosure significantly improves the bonding force of the positive film of the lithium-ion battery, and improves the flexibility of the positive film and processability thereof.

The technical solution employed by the present disclosure is: compared with homopolymer PVdF, the present disclosure copolymerizes alkyl, acrylate, and acrylic acid structural units, and also introduces alkyl units, which can improve mechanical properties of said copolymer, such as tensile strength and flexibility. The acrylate monomer can further improve flexibility of said copolymer, increase swelling, and improve ionic conductivity. Since the positive electrode current collector of a lithium-ion battery is aluminum foil, the surface of the positive electrode current collector is typically an oxidizing layer, which containing relatively more oxygen-containing groups. By introducing acrylic acid monomers, —COOH has a hydrogen bond action with oxygen-containing groups on the surface of aluminum foil, which significantly improves the bonding force of the electrode film. When the bonding agent according to the present disclosure is used to prepare a positive film, the positive film has a high bonding force, good flexibility, and excellent processability. After being immersed in an electrolyte, it has relatively good ion-transferring performance, which can improve the performance of the lithium-ion battery.

The structural formula of the bonding agent according to the present disclosure is shown by Formula V:

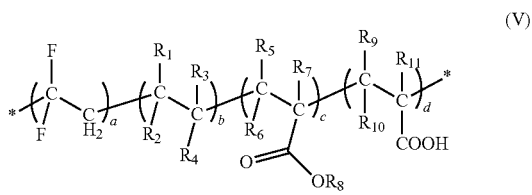

Wherein, in one aspect, a=50% to 90%, b=0.1% to 20%, c=1% to 25%, d=0.1% to 10%; and in a further aspect, a=60 to 75%, b=5% to 10%, c=10% to 25%, d=3 to 5%.

In one aspect, each of $R_1$, $R_2$, $R_3$, and $R_4$ is independently selected from the group consisting of hydrogen, and $C_{1-8}$ straight-chain or branched alkyl groups substituted by a substituting group or not substituted by a substituting group; further, in one aspect, each of $R_1$, $R_2$, $R_3$, and $R_4$ is independently selected from the group consisting of hydrogen, and $C_{1-6}$ straight-chain or branched alkyl groups; yet further, in one aspect, each of $R_1$, $R_2$, $R_3$, and $R_4$ is independently selected from the group consisting of hydrogen and $C_{1-3}$ alkyl groups.

In one aspect, each of $R_5$, $R_6$, and $R_7$ is independently selected from the group consisting of hydrogen, and $C_{1-6}$ straight-chain or branched alkyl groups substituted by a substituting group or not substituted by a substituting group; further, in one aspect, each of $R_5$, $R_6$, and $R_7$ is independently selected from the group consisting of hydrogen and $C_{1-3}$ alkyl groups; yet further, in one aspect, each of $R_5$, $R_6$, and $R_7$ is independently selected from the group consisting of hydrogen, methyl, and trifluoromethyl.

In one aspect, $R_8$ is selected from $C_{1-15}$ alkyl groups substituted by a substituting group or not substituted by a substituting group; further, in one aspect, $R_8$ is selected from $C_{1-12}$ alkyl groups substituted by a substituting group or not substituted by a substituting group; yet further, in one aspect, $R_8$ is selected from the group consisting of methyl, ethyl, n-butyl, isobutyl, sec-butyl, t-butyl, n-propyl, cyclohexyl, $C_{12}$ alkyl, 2-ethylhexyl, isobornyl, trifluoroethyl, and trifluoromethyl.

In one aspect, each of $R_9$, $R_{10}$, and $R_{11}$ is independently selected from the group consisting of hydrogen, and $C_{1-6}$ straight-chain or branched alkyl groups substituted by a substituting group or not substituted by a substituting group; further, in one aspect, each of $R_9$, $R_{10}$, and $R_{11}$ is independently selected from the group consisting of hydrogen and $C_{1-3}$ alkyl groups; yet further, in one aspect, each of $R_9$, $R_{10}$, and $R_{11}$ is independently selected from the group consisting of hydrogen, methyl, and trifluoromethyl.

The substituting group is selected from halogens. In one aspect, the halogen may be F, Cl, or Br.

In one aspect, the number average molecular weight of the bonding agent is 500,000 to 1.2 million.

A preferred upper limit of number of carbon atoms in the alkyl groups described above is sequentially 15, 12, 10, 8, 6, 4 and 3. For example, if the upper limit of number of carbon atoms is 12, the range of number of carbon atoms in the alkyl groups is 1 to 12; the preferable number of carbon atoms in the alkyl groups is 1 to 6, and the further preferable number of carbon atoms in the alkyl groups 1 to 3. The alkyl group may be a linear alkyl group or a cycloalkyl group. The linear alkyl group comprises straight-chain alkyl groups and branched alkyl groups. The cycloalkyl group is a saturated alkyl group that contains an alicyclic ring structure. The alicyclic ring may or may not contain a substituting group.

The above $C_{1-15}$ alkyl groups include, but are not limited to: —$CH_3$, —$CH_2CH_3$, —$(CH_2)_2CH_3$, —$CH(CH_3)_2$, —$(CH_2)_3CH_3$, —$CH_2CH(CH_3)_2$, —$CH(CH_3)CH_2CH_3$, —$CH_2CH(CH_3)_2$, —$C(CH_3)_3$, —$(CH_2)_4CH_3$, —$CH_2CH(CH_3)_2$, —$CH(CH_3)CH_2CH_3$, —$CH_2CH(CH_3)CH_2CH_3$, —$CH_2C(CH_3)_3$, n-heptyl, cyclopropyl, cyclohexyl, n-octyl, 2-ethylhexyl, n-$C_{10}$ alkyl groups, n-$C_{12}$ alkyl groups, n-$C_{15}$ alkyl groups, and isobornyl.

Wherein, the maximum value of a may be 90%, 85%, 80%, 75%, 70%; and the minimum value of a may be 50%, 53%, 55%, 60%, etc. For example, the range of values for a may be 55% to 85%, 60% to 85%, etc. The maximum value of b may be 20%, 18%, 15%, 12%, 10%, etc.; and the minimum value of b may be 0.1%, 1%, 2%, 4%, etc. For example, the range of values for b may be 1% to 20%, 2 to 15%, 5 to 15%, etc. The maximum value of c may be 25%, 22%, 20%, etc.; and the minimum value of c may be 1%, 2%, 5%, 8%, 10%, etc. For example, the range of values for c may be 2% to 25%, 5 to 25%, 5 to 20%, etc.

The present disclosure further relates to a preparation method for said bonding agent: preparing said bonding agent by means of emulsion polymerization on PVdF monomer, alkene monomer unit, acrylate monomer, and acrylic acid monomer.

The present disclosure further relates to a lithium-ion battery, comprising a positive film, a negative film, a separator, and an electrolyte, at least one of the positive film, the negative film, and the separator comprises the bonding agent according to the present disclosure. The positive film comprises a positive electrode current collector and a positive electrode active substance layer. In one aspect, the percent by weight of the bonding agent in the positive electrode active substance layer is 1.0 to 5.0%. In a further aspect, the percent by weight of the bonding agent in the positive electrode active substance layer is 1.5 to 2.5%.

Examples 1 to 8

The examples provide a method of preparing a bonding agent PVdF-Ac for a positive film of a lithium-ion battery, as well as a positive film and a lithium-ion battery fabricated with said bonding agent.

Wherein, PVdF-Ac is prepared by means of emulsion polymerization, and the molar contents of monomers are listed in Table 1:

TABLE 1

(unit: molar percent)

|  | vinylidene difluoride | ethylene | methyl acrylate monomer | acrylic acid monomer |
|---|---|---|---|---|
| Example 1 | 60 | 10 | 25 | 5 |
| Example 2 | 62 | 10 | 25 | 3 |
| Example 3 | 64 | 10 | 25 | 1 |
| Example 4 | 67 | 10 | 20 | 3 |
| Example 5 | 72 | 10 | 15 | 3 |
| Example 6 | 65 | 5 | 25 | 5 |
| Example 7 | 55 | 10 | 25 | 10 |
| Example 8 | 64.9 | 10 | 25 | 0.1 |

The polymerization method is:

Add deionized water, a dispersing agent, a pH adjusting agent, and a chain transferring agent; remove oxygen in vacuum; add a fixed amount of acrylate, acrylic acid monomer, and ½ of the above desired amount of vinylidene difluoride; add an initiator; control temperature and pressure; start the polymerization reaction; and continuously add the remaining ½ of vinylidene difluoride, and ethylene; and when the polymerization ends, subject the polymer to demulsification, washing, and drying, and obtain a PVdF-Ac product with a molecular weight of 600,000 to 1.20 million.

Examples 1 to 8 provide lithium-ion batteries, comprising a positive film, a negative film, a separator, and an electrolyte. The positive film comprises a positive electrode current collector and a positive electrode active substance layer. The positive electrode current collector may be aluminum foil. The positive electrode active substance layer comprises the following ingredients according to percent by weight:

The positive electrode active substance is LiCoO$_2$ with a content of 95.5%;

The positive electrode bonding agent is PVdF-Ac obtained in Examples 1 to 8, respectively, with a molecular weight of 600,000 to 1.20 million and a content of 2.5%;

The content of the positive electrode conductive agent is 2.0%;

The positive electrode current collector is aluminum foil with a thickness of 14 μm.

The negative film comprises a negative electrode current collector and a negative electrode active substance layer. The negative electrode active substance layer comprises the following ingredients according to percent by weight:

The negative electrode active substance is artificial graphite with a content of 95.0%;

The negative electrode bonding agent is SBR with a content of 2.0%;

The negative electrode paste stabilizing agent is sodium carboxymethyl cellulose with a content of 2%;

The content of the negative electrode conductive agent is 1.0%;

The negative electrode current collector is copper foil with a thickness of 10 μm.

The separator is a polyethylene separator with a thickness of 14 μm.

The electrolyte comprises an organic solvent and a lithium salt. The organic solvent is a mixture of diethyl carbonate, dimethyl carbonate, and ethylene carbonate. The volumetric ratio of the three solvents is 1:1:1. The lithium salt is LiPF$_6$ with a concentration of 1 mol/L.

The method for fabricating a lithium-ion battery is:

Preparation of a positive film: add 95.0% LiCoO$_2$, 3.0% PVdF-Ac, and 2.0% positive electrode conductive agent into NMP; mix homogeneously; coat onto aluminum foil; and obtain a positive film through drying, rolling, cutting, and welding a positive electrode tab;

Preparation of a negative film: add 95.0% artificial graphite, 2.0% sodium carboxymethyl cellulose, 1.0% negative electrode conductive agent, and 2.0% SBR into distilled water; mix homogeneously; coat onto copper foil; and obtain a negative film through drying, rolling, cutting, and welding a negative electrode tab;

Preparation of a battery: wind the positive film, the negative film, and the separator into a battery core; place the battery core in an aluminum laminated film; bake to remove water; then inject an electrolyte to perform formation and aging on the battery core; and obtain corresponding lithium-ion batteries B1 to B8.

Comparison Examples 1 to 3

Prepare lithium-ion batteries in Comparison Examples 1 to 3 accordingly to the method described above for Examples 1 to 8. The difference is in that the added positive electrode bonding agents are different for Comparison Examples 1 to 3. The compositions of the positive electrode bonding agents in Comparison Examples 1 to 3 are specifically listed in Table 2 below.

The fabrication processes for the positive films, the negative films, and the batteries are the same as those for Examples 1 to 8, and the obtained batteries are Bd1, Bd2, and Bd3, respectively.

TABLE 2

| | Positive electrode bonding agent |
|---|---|
| Comparison Example 1 | homopolymer polyvinylidene fluoride with a molecular weight of 600,000 to 1.20 million and a content of 2.5% |
| Comparison Example 2 | copolymer PVdF-HFP with a molecular weight of 600,000 to 1.20 million and a content of 2.5% |
| Comparison Example 3 | A blend of PVdF and polymethyl acrylate: PVdF having a molecular weight of 600,000 to 1.20 million and a content of 2.0%, and polyacrylic acid having a molecular weight of 200,000 to 1 million and a content of 0.5% |

Comparison Examples 4 to 10

Prepare lithium-ion batteries in Comparison Examples 4 to 10 accordingly to the method described above for Examples 1 to 8. The difference is that the proportions of monomers added into the positive electrode bonding agents PVdF-Ac are different. The proportions of 4 monomers in PVdF-Ac of Comparison Examples 4 to 10 are specifically listed in Table 3 below.

The fabrication processes for the positive films, the negative films, and the batteries are the same as those for Examples 1 to 8, and the obtained batteries are Bd4, Bd5, Bd6, Bd7, Bd8, Bd9, and Bd10, respectively.

TABLE 3

(unit: molar percent)

|  | vinylidene difluoride | ethylene | methyl acrylate monomer | acrylic acid monomer |
|---|---|---|---|---|
| Comparison Example 4 | 90 | — | 10 | — |
| Comparison Example 5 | 95 | — | — | 5 |

TABLE 3-continued (unit: molar percent)

|  | vinylidene difluoride | ethylene | methyl acrylate monomer | acrylic acid monomer |
|---|---|---|---|---|
| Comparison Example 6 | 85 | — | 10 | 5 |
| Comparison Example 7 | 80 | 20 | — | — |
| Comparison Example 8 | 85 | 5 | 10 | — |
| Comparison Example 9 | 75 | 20 | — | 5 |
| Comparison Example 10 | 40 | 20 | 20 | 20 |

(I) Stress-Strain Test on Bonding Agent Adhesive Films:

Use PVdF-Ac in Example 4 to prepare a 10% by weight NMP solution; take certain amount of the solution and place it into a mold; dry at 80° C. in an oven; and obtain an adhesive film of PVdF-Ac. Correspondingly, prepare an adhesive film of homopolymer PVdF. Take adhesive films of PVdF-Ac and homopolymer PVdF with the same width and thickness, test stress-strain curves, which can provide breaking strength and elongation at break. FIG. 1 is a diagram 100 illustrating comparison curves of breaking strength and elongation at break of adhesive films of PVdF-Ac and homopolymer PVdF.

Figure 2:
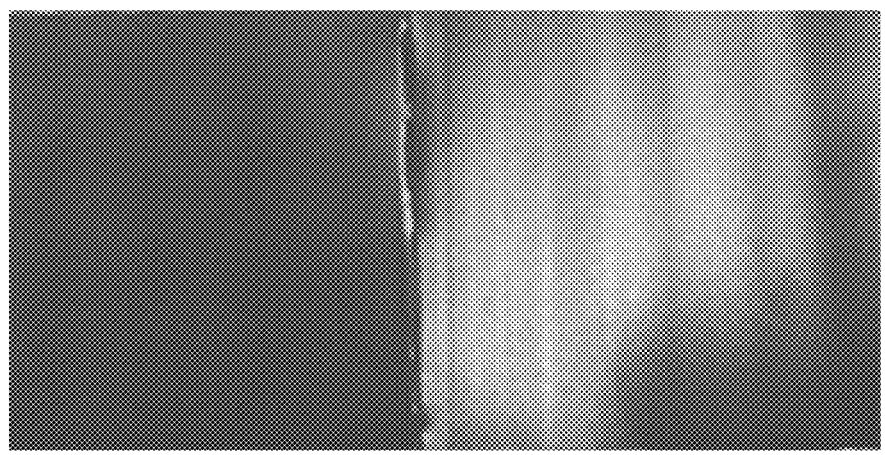
FIG. 2 is a diagram illustrating a photo of an electrode film with homopolymer PVdF as a bonding agent.
Figure 3:
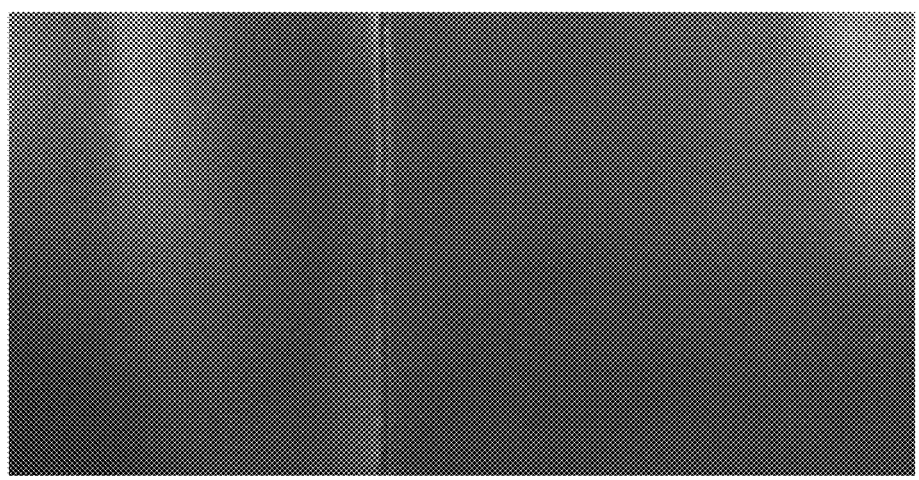
FIG. 3 is a diagram illustrating a photo of an electrode film with copolymer PVdF-Ac as a bonding agent.

(II) Flexibility of Positive Films:

Use homopolymer PVdF or copolymer PVdF-Ac for comparison as a positive electrode bonding agent, and prepare a positive film according to the steps described above for Examples 1 to 8. Take positive films under the same compact density; use a paint film flexibility tester to test the flexibility of the electrode films. The curvature radius of the mandrel rod used is 0.5 mm. The difference in flexibility between the electrode films can be observed, as shown in FIG. 2 and FIG. 3. FIG. 2 is a diagram 200 illustrating a photo of an electrode film with homopolymer PVdF as a bonding agent. When a paint film flexibility tester (the curvature radius of the mandrel rod used is 0.5 mm) is used to test the electrode film with homopolymer PVdF as a bonding agent, some areas are brittle and broken (with light passing through) after the electrode film is bent. Correspondingly, FIG. 3 is a diagram 300 illustrating an electrode film with copolymer PVdF-Ac as a bonding agent. When the electrode film with copolymer PVdF-Ac as a bonding agent is tested by a paint film flexibility tester (the curvature radius of the mandrel rod used is 0.5 mm), there are no issues such as brittle and broken or light passing after the electrode film is bent. Namely, the electrode film with copolymer PVdF-Ac as a bonding agent has a better flexibility than the electrode film with homopolymer PVdF as a bonding agent does.

(III) Bonding Force Test on Positive Films:

Before immersion in an electrolyte: take a positive film after coating and cold pressing, and cut into 100 mm long and 10 mm wide rectangles. Take a 25 mm wide stainless steel panel, attach a piece of double faced adhesive tape (11 mm wide) thereto, attach the cut electrode film onto the double faced adhesive tape on the stainless steel panel, use a 2000 g press roll to roll back and forth on the surface of the cut electrode film for 3 times (300 mm/min). Bend the electrode film by 180 degrees, manually rip apart 25 mm, fix said specimen onto a tester such that the peeling surface is aligned with the force line of the tester, the tester continuously peels off at 300 mm/min, obtain a peeling force curve, take the average of the smooth segment as the peeling force $F_0$. Then the bonding force of a positive film being tested is: $F=F_0/0.01=100F_0$ (N/m).

After immersion in an electrolyte: take a positive film after coating and cold, and cut into 100 mm long and 10 mm wide rectangles. Immerse in an electrolyte, the electrolyte comprises an organic solvent and a lithium salt. The organic solvent is a mixture of diethyl carbonate, dimethyl carbonate, and ethylene carbonate. The volumetric ratio of the three solvents is 1:1:1. The lithium salt is $LiPF_6$, with a concentration of 1 mol/L. Place in a dry environment (with the relative humidity <5%); immerse at room temperature for 24 h; evaporate naturally in a dry environment; and when the solvent is completely evaporated from the surface of the positive film, test the bonding force of the positive film. The testing method and bonding force calculation method are the same as above. See Table 4 below for the testing data.

TABLE 4

Bonding force data of positive films (Unit: N/m)

|  | Before immersion in an electrolyte | After immersion in an electrolyte |
|---|---|---|
| Example 1 | 182.3 | 122.7 |
| Example 2 | 138.1 | 104.3 |
| Example 3 | 134.9 | 93.4 |
| Example 4 | 122.4 | 99.1 |
| Example 5 | 106.8 | 86.5 |
| Example 6 | 165.3 | 109.7 |
| Example 7 | 211.8 | 156.2 |
| Example 8 | 85.2 | 18.3 |
| Comparison Example 1 | 21.5 | 4.8 |
| Comparison Example 2 | 17.7 | 2.1 |
| Comparison Example 3 | 81.7 | 2.5 |
| Comparison Example 4 | 72.5 | 6.3 |
| Comparison Example 5 | 113.2 | 49.6 |
| Comparison Example 6 | 131.9 | 64.3 |
| Comparison Example 7 | 24.3 | 3.5 |
| Comparison Example 8 | 73.7 | 5.9 |
| Comparison Example 9 | 117.8 | 53.8 |
| Comparison Example 10 | 483.3 | 282.6 |

(IV) Battery Performance Test:

1. Battery Discharge Rate Performance Test

1) At normal temperature, charge to 4.35 V at a constant current of 0.5 C (C-rate), and then charge at a constant voltage until 0.05 C. Discharge to 3.0 V at a constant current of 0.5 C, record capacity, and use this capacity as 100%;

2) At normal temperature, charge to 4.35 V at a constant current of 1.0 C, and then charge at a constant voltage until 0.05 C. Discharge to 3.0 V at a constant current of 0.5 C, record capacity, and calculate percent;

3) At normal temperature, charge to 4.35 V at a constant current of 1.5 C, and then charge at a constant voltage until 0.05 C. Discharge to 3.0 V at a constant current of 0.5 C, record capacity, and calculate percent;

4) At normal temperature, charge to 4.35 V at a constant current of 2.0 C, and then charge at a constant voltage until 0.05 C. Discharge to 3.0 V at a constant current of 0.5 C, record capacity, and calculate percent.

See Table 5 for the testing data.

TABLE 5

Battery discharge rate performance (Unit: %)

| | 0.5 C | 1.0 C | 2.0 C | 3.0 C |
|---|---|---|---|---|
| Example 1 | 100.0 | 93.6 | 80.7 | 56.3 |
| Example 2 | 100.0 | 93.8 | 81.9 | 58.8 |
| Example 3 | 100.0 | 94.5 | 84.3 | 69.2 |
| Example 4 | 100.0 | 93.9 | 83.5 | 62.3 |
| Example 5 | 100.0 | 93.3 | 81.6 | 58.7 |
| Example 6 | 100.0 | 92.7 | 82.5 | 67.5 |
| Example 7 | 100.0 | 91.9 | 77.6 | 51.2 |
| Example 8 | 100.0 | 95.1 | 86.5 | 69.9 |
| Comparison Example 1 | 100.0 | 92.9 | 78.3 | 52.3 |
| Comparison Example 2 | 100.0 | 92.6 | 77.1 | 49.9 |
| Comparison Example 3 | 100.0 | 91.7 | 71.1 | 31.9 |
| Comparison Example 4 | 100.0 | 93.4 | 79.9 | 56.4 |
| Comparison Example 5 | 100.0 | 91.3 | 76.8 | 49.1 |
| Comparison Example 6 | 100.0 | 93.6 | 78.9 | 55.0 |
| Comparison Example 7 | 100.0 | 92.7 | 77.6 | 51.1 |
| Comparison Example 8 | 100.0 | 93.1 | 78.3 | 54.7 |
| Comparison Example 9 | 100.0 | 91.7 | 76.6 | 50.8 |
| Comparison Example 10 | 100.0 | 88.3 | 70.6 | 42.5 |

2. Battery Cycle Life Performance Test

1) At normal temperature, charge to 4.35 V at a constant current of 0.5 C, and then charge at a constant voltage until 0.05 C.
2) Discharge to 3.0 V at a constant current of 0.5 C, record capacity, and use the first recorded battery capacity as 100%;
3) Repeat Steps 1 and 2, and record the percent of remaining battery capacity.
See Table 6 for the testing data.

TABLE 6

Battery cycle life performance (Unit:%)

| | 0 | 100 | 200 | 300 | 400 |
|---|---|---|---|---|---|
| Example 1 | 100.0 | 92.2 | 91.6 | 87.3 | 81.9 |
| Example 2 | 100.0 | 93.8 | 93.0 | 89.7 | 85.3 |
| Example 3 | 100.0 | 94.1 | 92.9 | 90.1 | 86.1 |
| Example 4 | 100.0 | 94.0 | 93.1 | 90.9 | 86.9 |
| Example 5 | 100.0 | 93.8 | 92.8 | 89.9 | 85.8 |
| Example 6 | 100.0 | 93.5 | 92.7 | 89.5 | 85.1 |
| Example 7 | 100.0 | 91.8 | 90.6 | 87.9 | 82.6 |
| Example 8 | 100.0 | 93.9 | 92.6 | 89.6 | 84.8 |
| Comparison Example 1 | 100.0 | 91.9 | 88.1 | 82.7 | 76.9 |
| Comparison Example 2 | 100.0 | 92.9 | 90.3 | 85.1 | 77.6 |
| Comparison Example 3 | 100.0 | 91.0 | 86.9 | 61.3 | 31.7 |
| Comparison Example 4 | 100.0 | 94.1 | 91.2 | 86.2 | 75.2 |
| Comparison Example 5 | 100.0 | 91.2 | 85.3 | 79.1 | 72.3 |
| Comparison Example 6 | 100.0 | 93.5 | 91.0 | 86.6 | 79.2 |
| Comparison Example 7 | 100.0 | 91.3 | 87.2 | 80.3 | 69.4 |
| Comparison Example 8 | 100.0 | 92.1 | 88.6 | 82.0 | 71.5 |
| Comparison Example 9 | 100.0 | 92.7 | 91.1 | 85.3 | 78.1 |
| Comparison Example 10 | 100.0 | 90.3 | 85.6 | 77.0 | 59.6 |

Examples 9 to 22

Prepare a bonding agent according to the method in Example 1. The structural formula of the polymer is shown by Formula V, wherein substituting groups of $R_1$ to $R_{11}$ are listed in Table 7, and values of a, b, c and d are listed in Table 8:

TABLE 7

| Example | $R_1$ | $R_2$ | $R_3$ | $R_4$ | $R_5$ | $R_6$ | $R_7$ | $R_8$ | $R_9$ | $R_{10}$ | $R_{11}$ |
|---|---|---|---|---|---|---|---|---|---|---|---|
| Example 9 | —H | —H | —H | —H | —H | —H | —H | —CH$_3$ | —CF$_3$ | —H | —H |
| Example 10 | —CH$_3$ | —H | —H | —H | —H | —H | —CH$_3$ | —CH$_2$CH$_3$ | —CF$_3$ | —H | —H |
| Example 11 | —CH$_3$ | —CH$_3$ | —H | —H | —H | —H | —CH$_3$ | —CH$_3$ | —H | —H | —CH$_3$ |
| Example 12 | —H | —H | —CH$_3$ | —H | —H | —H | —CH$_3$ | n-butyl | —H | —H | —CH$_3$ |
| Example 13 | —H | —H | —CH$_3$ | —CH$_3$ | —H | —H | —CH$_3$ | isobutyl | —H | —H | —H |
| Example 14 | —H | —H | —H | —H | —CH$_3$ | —H | —H | t-butyl | —H | —H | —H |
| Example 15 | —CH$_3$ | —H | —H | —H | —CH$_3$ | —H | —H | 2-ethylhexyl | —H | —CH$_3$ | —H |
| Example 16 | —CH$_3$ | —H | —H | —H | —CH$_3$ | —H | —H | C$_{10}$ n-alkyl | —H | —CH$_3$ | —H |
| Example 17 | —H | —H | —H | —H | —CF$_3$ | —H | —H | n-butyl | —CH$_3$ | —H | —H |
| Example 18 | —H | —H | —H | —H | —CF$_3$ | —H | —H | n-propyl | —CH$_3$ | —H | —H |
| Example 19 | —H | —H | —H | —H | —CF$_3$ | —H | —H | cyclohexyl | —H | —H | —CF$_3$ |
| Example 20 | —H | —H | —H | —H | —H | —H | —CH$_3$ | trifluoroethyl | —H | —H | —CF$_3$ |
| Example 21 | —CH$_3$ | —H | —H | —H | —H | —H | —CF$_3$ | isobornyl | —CF$_3$ | —H | —CF$_3$ |
| Example 22 | —CH$_3$ | —H | —H | —H | —H | —H | —CF$_3$ | C$_{12}$ n-alkyl | —CF$_3$ | —H | —H |

TABLE 8

(unit: molar percent)

| | a | b | c | d |
|---|---|---|---|---|
| Example 9 | 50 | 10 | 25 | 5 |
| Example 10 | 90 | 0.1 | 9.8 | 0.1 |
| Example 11 | 75 | 1 | 23 | 1 |
| Example 12 | 80 | 10 | 7 | 3 |
| Example 13 | 80 | 10 | 8 | 2 |
| Example 14 | 55 | 15 | 25 | 5 |
| Example 15 | 60 | 15 | 20 | 5 |
| Example 16 | 65 | 10 | 20 | 5 |
| Example 17 | 70 | 8 | 12 | 10 |
| Example 18 | 68 | 12 | 15 | 5 |
| Example 19 | 73 | 15 | 10 | 2 |
| Example 20 | 70 | 10 | 14 | 6 |
| Example 21 | 75 | 1 | 14 | 10 |
| Example 22 | 50 | 20 | 20 | 10 |

Lithium-ion batteries fabricated with bonding agents having structural formulae in Examples 9 to 22 have a similar performance to those in the preceding examples.

The present disclosure has been disclosed with reference to preferred examples as above, which, however, are not used to limit the claims. without departing from the concept of the present disclosure, those skilled in the art may make some possible variations and modifications. Therefore, the scope of the present disclosure shall be subject to the scope defined by the claims of the present disclosure.

According to the disclosure and description above, those skilled in the art may further make variations and modifications to the above embodiments. Therefore, the present disclosure is not limited by the specific embodiments disclosed and described above. Some equivalent variations and modifications to the present disclosure shall also be encompassed the claims of the present disclosure. Although the Description uses some specific terms, in addition, the terms are used only for the purpose of easy description, which do not constitute any limitation to the present disclosure.

What is claimed is:

1. A lithium-ion battery, comprising:
a positive electrode;
a negative electrode;
a separator; and
an electrolyte,
wherein at least one of the positive electrode, the negative electrode, and/or the separator comprises a bonding agent, the bonding agent comprising a polymer having at least four different structural units represented by each of Formula I, Formula II, Formula III, and Formula IV:

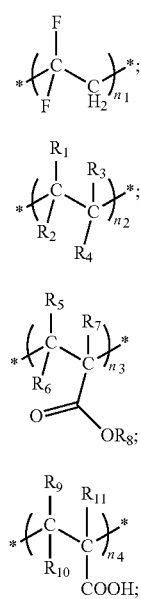

wherein each of $R_1$, $R_2$, $R_3$, and $R_4$ is independently selected from the group consisting of hydrogen, and $C_{1-8}$ straight-chain or branched alkyl groups substituted by a substituting group or not substituted by a substituting group, wherein each of $R_5$, $R_6$, and $R_7$ is independently selected from the group consisting of hydrogen, and $C_{1-6}$ straight-chain or branched alkyl groups substituted by a substituting group or not substituted by a substituting group, $R_8$ is selected from $C_{1-15}$ alkyl groups substituted by a substituting group or not substituted by a substituting group, each of $R_9$, $R_{10}$, and $R_{11}$ is independently selected from the group consisting of hydrogen, and $C_{1-6}$ straight-chain or branched alkyl groups substituted by a substituting group or not substituted by a substituting group, and the substituting group is selected from halogens, and wherein each of $n_1$, $n_2$, $n_3$ and $n_4$ is independently an integer greater than 0.

2. The lithium-ion battery of claim 1, wherein:
a molar percent of structural units represented by Formula I in the bonding agent is 50% to 90%;
a molar percent of structural units represented by Formula II in the bonding agent is 0.1% to 20%;
a molar percent of structural units represented by Formula III in the bonding agent is 1% to 25%;
a molar percent of structural units represented by Formula IV in the bonding agent is 0.1% to 10%.

3. The lithium-ion battery of claim 2, wherein:
the molar percent of structural units represented by Formula I in the bonding agent is 60% to 75%;
the molar percent of structural units represented by Formula II in the bonding agent is 5% to 10%;
the molar percent of structural units represented by Formula III in the bonding agent is 10% to 25%;
the molar percent of structural units represented by Formula IV in the bonding agent is 3% to 5%.

4. The lithium-ion battery of claim 1, wherein, in Formula II, each of $R_1$, $R_2$, $R_3$, and $R_4$ is independently selected from the group consisting of hydrogen, and $C_{1-6}$ straight-chain or branched alkyl groups.

5. The lithium-ion battery of claim 4, wherein, in Formula II, each of $R_1$, $R_2$, $R_3$, and $R_4$ is independently selected from the group consisting of hydrogen and $C_{1-3}$ alkyl groups.

6. The lithium-ion battery of claim 1, wherein, in Formula III, each of $R_5$, $R_6$, and $R_7$ is independently selected from the group consisting of hydrogen and $C_{1-3}$ alkyl groups, wherein $R_8$ is selected from $C_{1-12}$ alkyl groups substituted by a substituting group or not substituted by a substituting group.

7. The lithium-ion battery of claim 1, wherein, in Formula IV, each of $R_9$, $R_{10}$, and $R_{11}$ is independently selected from the group consisting of hydrogen and $C_{1-3}$ alkyl groups.

8. The lithium-ion battery of claim 1, wherein a number average molecular weight of the bonding agent is 500,000 to 1.2 million.

9. The lithium-ion battery of claim 1, wherein the lithium-ion battery comprises the bonding agent in the positive electrode.

10. The lithium-ion battery of claim 9, wherein the positive electrode comprises a positive electrode current collector and a positive electrode active material layer, and percent by weight of the bonding agent in the positive electrode active material layer is 1.0% to 5.0%.

* * * * *